3,545,989
LOW LOSS LEAD FLUORIDE SEALING GLASSES
Masanari Mikoda, Hirakata-shi, and Tadashi Hikino, Takatsuki-shi, Japan, assignors to Matsushita Electric Industrial Co., Ltd., Osaka, Japan
No Drawing. Filed Mar. 17, 1967, Ser. No. 623,844
Claims priority, application Japan, Dec. 12, 1966, 41/82,322
Int. Cl. C03c 3/04
U.S. Cl. 106—53    2 Claims

ABSTRACT OF THE DISCLOSURE

The PbO conventionally used in $B_2O_3$-PbO-ZnO sealing glass is replaced by $PbF_2$ to give glass of superior properties: lower sealing temperature, lower dissipation factor, homogeneous crystallization, coefficient of linear expansion compatible with materials to be sealed together (e.g. color grid parts, etc.).

---

This invention relates to crystallizable sealing glasses that have low sealing temperatures, and particularly have low dissipation factors. Crystallizable sealing glasses according to the prior art comprise basically $B_2O_3$, PbO and ZnO, and have relatively high dissipation factor.

It is an object of this invention to produce crystallizable sealing glasses that have lower sealing temperature, and particularly lower dissipation factors than those of the previous crystallizable sealing glasses. Crystallizable sealing glasses of this invention become soft and crystallize below 500° C. and have dissipation factors lower than 0.0030 at 10 mc. and at 20° C.

The coefficients of linear expansion of the crystallized sealing glasses of this invention are compatible with soft glass, iron, aluminum, copper, brass and noble metals. The low loss crystallizable sealing glasses of this invention have the following compositions:

| | Mole percent |
|---|---|
| $B_2O_3$ | 20 to 37 |
| $PbF_2$ | 43 to 62 |
| ZnO | 8 to 27 |
| $SiO_2$ | 0 to 6 |
| $Al_2O_3$ | 0 to 4 |

Although the glasses of this invention are essentially composed of three constituents in the proportions set forth herein, minor portions of other ingredients can be judiciously added to the compositions without materially changing the basic and novel characteristics of the glasses defined herein. Small amounts of other oxides such as $As_2O_3$ and $Sb_2O_3$ may be contained in the glass of this invention as fining ingredients.

Glasses containing less than 20 mole percent of $B_2O_3$ crystallize rapidly and are incapable of producing seals, whereas glasses containing more than 37 mole percent of $B_2O_3$ tend to crystallize too slowly and to act as a stable type glass. Glasses containing more than 27 mole percent of ZnO crystallize so fast that the glasses cannot sufficiently wet a sealing surface.

Glasses with the ZnO content less than 8 mole percent have poor resistance to moisture and high dissipation factors. Glasses with less than 43 mole percent $PbF_2$ have sealing temperatures higher than 500° C. Glasses with more than 62 mole percent $PbF_2$ tend to crystallize rapidly and cannot be used for fusion sealing.

Crystallizable sealing glasses according to this invention have lower sealing and lower crystallization temperatures than those of the prior art. For example, the glass coersponding to composition No. 1 of Table I melts at 800° C. and has a softening temperature of 300° C. and a sealing temperature of 450° C. On the other hand, the glass containing PbO in place of $PbF_2$ in the composition No. 1 of Table I melts at 1000° C. and has a softening temperature of 350° C. and a sealing temperature of 500° C.

The crystallizable sealing glasses of this invention crystallize at low temperatures and have low dissipation factors at high frequency. For example, glass composition No. 1 has a dissipation factor of 0.0017 at 10 mc. and at 20° C. when it is crystallized at 360° C. for 10 hours. The glass containing PbO in place of $PbF_2$ in composition No. 1 has a dissipation factor of 0.0090 at 10 mc. and at 20° C. when it is crystallized at 450° C. for 10 hours.

Moreover, the dissipation factor of the fluoride glass of this invention is remarkably decreased after crystallization whereas that of the corresponding oxide glass increases after crystallization. The fluoride glass crystallizes homogeneously throughout the body, whereas the oxide glass starts to crystallize from the surface of the body.

Furthermore, the crystallizable sealing glasses of this invention have relatively high coefficients of linear expansion which are compatible with iron, aluminum, copper, brass and noble metals. The coefficients of linear expansion of the crystallized glasses of this invention are $100 \times 10^{-7}$ to $180 \times 10^{-7}$. The coefficients of linear expansion can be controlled by slightly changing the proportion of the constituents within the ranges specified.

The following tables disclose eleven specific examples of compositions prepared in accordance with this invention. The compositions are expressed in both mole and weight percentages for convenience of ready comparison with the composition expressed in weight percentage.

Softening temperature, crystallization temperature, crystallization time, dissipation factor of crystallized glass of each composition are also shown in Table I.

The softening temperature of glass as referred to herein is determined by the fiber elongation method. The crystallization temperature of the glass is determined by differential thermal analysis.

The procedures of preparing specimens for electrical measurements are as follows: The batches were prepared using $H_3BO_3$, $PbF_2$, and ZnO of chemical reagent grade. About 100 gram batch of each composition shown in Table I was preheated at 300° C. for 1 hour to decompose $H_3BO_3$ into $B_2O_3$ completely and then was melted at 800°–1100° C. for 30 to 60 minutes to produce a homogeneous glass. Such temperatures and times depend upon the composition of the batch. The preheating operation was effective for minimizing the volatilization of fluorine during the melting process. Chemical analyses showed little volatilization of fluorine after the above-mentioned melting procedure.

The molten glass was cast on a stainless-steel mold into a disk of 35 mm. in diameter and the disc was ground to a uniform thickness of 2 mm. The disks were crystallized under the conditions shown in Table I. The temperature was raised at the rate of 10° C./min. and the disks were cooled slowly in an electric furnace. The heat-treated disks were reground to 1.0 mm. thick. The electrodes were prepared by firing silver paste (e.g. that commercially available as Du Pont No. 5504A) on opposite surfaces of the disk. The dissipation factors of the crystallized glasses were measured with a Boonton 260–Ap Q-meter.

The results shown in Table I establish that the glass of this invention has low softening temperature, low crystallization temperature, and low dissipation factor after it crystallizes.

Table III shows some characteristics of the heat-treated glasses No. 1, No. 6 and No. 8 of Table I at various temperatures for 10 hours. The dissipation factor of the crystallized glass of each composition has a lower value than that of the glass in an amorphous state.

The enamel frit of this invention is used to seal different substances. For example, the enamel frit of this invention may be used for joining together metal wires and metal frame to form a color grid which is a part of a chromatron tube. In production of chromatron tubes, it is conventional to join the funnel and panel by using a intermediate sealing glass having a softening temperature of 400° C. to 500° C. The temperature of 400° C. to 500° C. can facilitate the bakeout operation and sealing operations at the same time. It is necessary that the seal is in a sufficiently high rigidity for joining the funnel and panel when the joined color grid is baked out at the temperature of 400° C. to 500° C.

However, soft sealing glasses which do not crystallize at sealing temperature tend to become soft and flow at 400° C. to 500° C., and to loosen the joined metal wires. A crystallized glass seal solves such a sealing trouble. Moreover, the seal glass of a color grid must have a low dissipation factor in high frequency.

Crystallizable sealing glass having a sealing temperature of 400–500° C., and a relatively high dissipation factor, i.e. 0.0094 at 100 kc. at 25° C., is known.

in a ball mill and ground to pass through a 325 mesh sieve.

For electrical measurements, the powdered glass was pressed into a disk of 20 mm. in diameter and 2 mm. thick. The pressed disks were sintered at 320° C. or 360° C. for 10 hours. The dissipation factors of the sintered bodies were 0.0014 and 0.0012, respectively. When the pressed body was sintered at 450° C. for 1 hour, the dissipation factor of the disk was 0.0020 at 10 mc. and the coefficient of thermal expansion (25°–250° C.) was about $150 \times 10^{-7}$. For the sealing, the powdered glass was dispersed in an organic vehicle composed of 90% by weight of carbitolacetate and 10% nitrocellulose at a weight ratio of 9 parts glass powder to 1 part vehicle. The resulting paste was brushed onto the surface of the joint of a color grid, and dried. The assembly was placed in an electric furnace, and heated at a rate of 10° C./min. to 250° C., and held for 10 minutes at this temperature for burning out the organic material. The temperature was then raised to 450° C., the sealing temperature, at the same heating rate, and held at that temperature for 1 hour to form a crystallized low loss seal. The rate of cooling was less than 10° C./min.

TABLE I.—BATCH COMPOSITION (MOLE PERCENT)

| | Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| $B_2O_3$ | 23 | 25 | 25 | 25 | 30 | 30 | 30 | 30 | 35 | 35 | 35 |
| ZnO | 23 | 25 | 20 | 15 | 25 | 20 | 15 | 10 | 20 | 15 | 10 |
| $PbF_2$ | 54 | 50 | 55 | 60 | 45 | 50 | 55 | 60 | 45 | 50 | 55 |
| Softening temperature | 300 | 305 | 292 | 288 | 335 | 320 | 313 | 306 | 348 | 338 | 332 |
| Crystallization: | | | | | | | | | | | |
| Temperature (° C.) | 360 | 360 | 360 | 360 | 380 | 380 | 380 | 380 | 390 | 390 | 390 |
| Time | 10 | 10 | 10 | 10 | 10 | 10 | 10 | 10 | 20 | 20 | 10 |
| Dissipation factor at 10 mc., 20° C. | 0.0017 | 0.0018 | 0.0020 | 0.0023 | 0.0018 | 0.0026 | 0.0023 | 0.0020 | 0.0022 | 0.0024 | 0.0027 |

TABLE II.—BATCH COMPOSITION, WEIGHT PERCENT

| | Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| $B_2O_3$ | 9.6 | 10.8 | 10.3 | 9.8 | 13.8 | 13.1 | 12.4 | 11.9 | 16.2 | 15.3 | 14.6 |
| ZnO | 11.2 | 12.7 | 9.7 | 6.9 | 13.5 | 10.2 | 7.3 | 4.6 | 10.8 | 7.7 | 4.8 |
| $PbF_2$ | 79.2 | 76.5 | 80.0 | 83.3 | 72.7 | 76.6 | 80.3 | 83.5 | 73.0 | 77.0 | 80.6 |

TABLE III

| Example No. | Heat treatment | | Dissipation factor after heat treatment | Appearance of the heat treated specimens | X-ray diffraction patterns |
|---|---|---|---|---|---|
| | Temperature (° C.) | Time (hr.) | | | |
| 1 | No heat treatment | | 0.0042 | Clear, colorless | Amorphous. |
| | 320 | 10 | 0.0023 | Slightly opalescent | Do. |
| | 360 | 10 | 0.0017 | Opaque | Crystallized. |
| | 400 | 10 | 0.0017 | do | Do. |
| | 430 | 10 | 0.0017 | do | Do. |
| 6 | No heat treatment | | 0.0043 | Clear, colorless | Amorphous. |
| | 350 | 10 | 0.0024 | Opaque | Crystallized. |
| | 380 | 10 | 0.0020 | do | Do. |
| | 400 | 10 | 0.0010 | do | Do. |
| 8 | No heat treatment | | 0.0030 | Clear, colorless | Amorphous. |
| | 330 | 10 | 0.0022 | Slightly opalescent | Do. |
| | 350 | 10 | 0.0015 | Opaque | Crystallized. |
| | 380 | 10 | 0.0014 | do | Do. |
| | 400 | 10 | 0.0018 | do | Do. |

The following additional examples are given to show the manner in which the enamel frit of this invention can be used for sealing several different substances, but should not be construed as limitative.

EXAMPLE 12

Glass composition No. 1 of Table I was melted at 800° C. for 30 minutes and water-quenched or rapidly cooled on a chilled metal surface. If the water-quenching is adopted, it is preferable to add a small amount of $Al_2O_3$ or $SiO_2$, not in excess of 4 mole percent or 6 mole percent respectively, to the glass composition to increase weathering resistance. The so-obtained frit was placed

EXAMPLE 13

Another crystallizable low loss sealing glass, of composition No. 6 of Table I, was prepared in the same manner as the glass was prepared in Example 12. The dissipation factor of the specimen sintered at 450° C., the sealing temperature, for 1 hour was 0.0020 at 10 mc., and the coefficient of thermal expansion (25°–250° C.) was $130 \times 10^{-7}$.

EXAMPLE 14

Another crystallizable low loss sealing glass, of composition No. 8 of Table I, was prepared in the same manner as that of the glass in Example 12. The dissipation factor of the specimen sintered at 435° C., the sealing temperature, for 1 hour was 0.0025 at 10 mc., and the coefficient of thermal expansion (25°–250° C.) was $170 \times 10^{-7}$.

EXAMPLE 15

Another crystallizable low loss sealing glass, of the composition consisting of 21.7 mole percent of $B_2O_3$, 50.9 mole percent of $PbF_2$, 21.7 mole percent of ZnO and 5.7 mole percent of $SiO_2$ was prepared in the same manner as the glass was prepared in Example 12. The dissipation factor of the specimen sintered at 400° C., the sealing temperature, for 1 hour was 0.0025 at 10 mc., and the coefficient of thermal expansion (25°–250° C.) was $110 \times 10^{-7}$.

EXAMPLE 16

Another crystallizable low loss sealing glass, of the composition consisting of 22.3 mole percent of $B_2O_3$, 52.5 mole percent of $PbF_2$, 22.3 mole percent of ZnO and 2.9 mole percent of $Al_2O_3$ was prepared in the same manner as that of the glass in Example 12. The dissipation factor of the specimen sintered at 400° C., the sealing temperature, for 1 hour was 0.0024 at 10 mc., and the coefficient of thermal expansion (25°–250° C.) was $124 \times 10^{-7}$.

Although the invention has been described with respect particularly to sealing glass as being useful for sealing metal parts in a color grid, the sealing glass is also useful for sealing other materials with compatible expansion characteristics, and is useful for encapsulating electrical components and other articles which are used in high frequency circuits.

What is claimed is:

1. A glass that is capable of crystallizing at a temperature below 500° C., and has a dissipation factor less than 0.0030 at 10 mc. and at 20° C. in the crystallized state, and coefficients of thermal expansion within a range of $100 \times 10^{-7}$ to $180 \times 10^{-7}$, said glass being in a composition which consists essentially of 20 to 37 mole percent of $B_2O_3$, 43 to 62 mole percent of $PbF_2$, 8 to 27 mole percent of ZnO, 0 to 6 mole percent of $SiO_2$ and 0 to 4 mole percent of $Al_2O_3$.

2. A glass according to claim 1, wherein said composition consists essentially of 23 mole percent $B_2O_3$, 23 mole percent of ZnO and 54 mole percent of $PbF_2$.

References Cited

UNITED STATES PATENTS

| | | | |
|---|---|---|---|
| 2,511,227 | 6/1950 | Sun | 106—47 |
| 2,889,952 | 6/1959 | Claypoole | 106—39X |
| 3,115,415 | 12/1963 | Hoffman | 106—49X |
| 3,206,355 | 9/1965 | Pfaender | 106—49X |
| 3,250,631 | 5/1966 | Lusher | 106—47 |
| 3,282,711 | 11/1966 | Lin | 106—39 |
| 3,291,586 | 12/1966 | Chapman et al. | 106—39X |

HELEN M. McCARTHY, Primary Examiner

W. R. SATTERFIELD, Assistant Examiner

U.S. Cl. X.R.

106—39, 49